Dec. 18, 1945.  A. L. PARKER  2,391,266
TUBE AND PROTECTIVE SLEEVE ASSEMBLY
Filed March 31, 1941  2 Sheets-Sheet 1
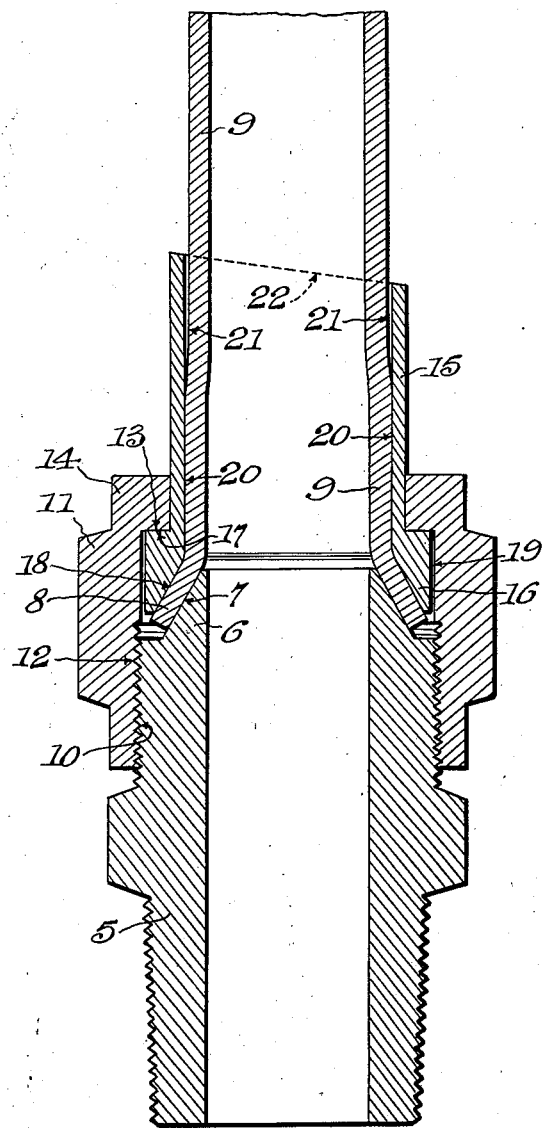
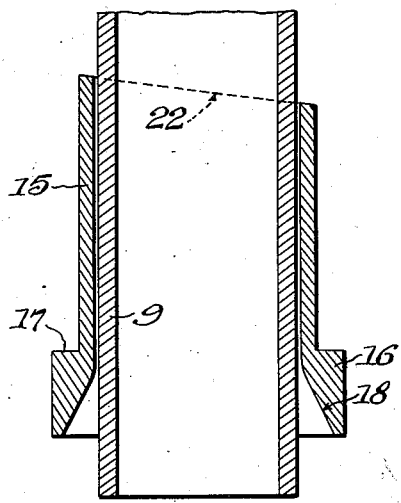
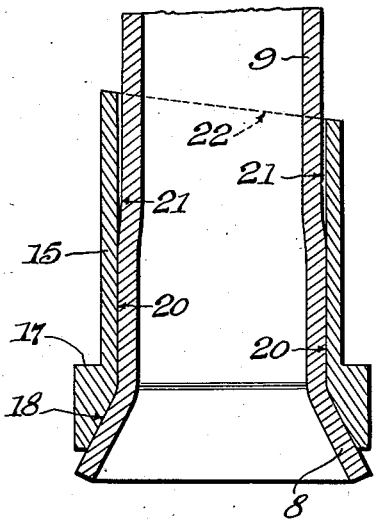
Inventor
Arthur L. Parker
By Mason & Porter
Attorneys Dec. 18, 1945.   A. L. PARKER   2,391,266
TUBE AND PROTECTIVE SLEEVE ASSEMBLY
Filed March 31, 1941    2 Sheets-Sheet 2

Inventor
Arthur L. Parker
By Mason & Porter
Attorneys

Patented Dec. 18, 1945

2,391,266

UNITED STATES PATENT OFFICE 2,391,266

TUBE AND PROTECTIVE SLEEVE ASSEMBLY

Arthur L. Parker, Cleveland, Ohio, assignor to The Parker Appliance Company, Cleveland, Ohio, a corporation of Ohio Application March 31, 1941, Serial No. 386,201

4 Claims. (Cl. 285—86)

The invention relates generally to tube couplings and primarily seeks to provide a novel tube and protective sleeve assembly or unit, that is a permanent assembly of a tube to be coupled and the sleeve which surrounds and protects it and also serves in part to clamp it in place in the complete coupling, the nature of the assembly serving to gradually dampen vibrations in the tube when coupled and thereby minimize tube breakage.

In the formation of certain forms of tube couplings, of which the coupling disclosed in U. S. Letters Patent 1,893,442 to Parker, issued January 3, 1933, forms an example, it is customary to provide the tubes with flared ends and to clamp said ends between opposing coniform male and female clamping surfaces, the latter of which are formed in sleeves which closely surround the tubes to protect them from excessive vibration and which include shoulders engaged by nuts adjustable along the axes of the tubes and sleeves to seat the sleeves in clamping engagement with the flared tubes and the opposing male clamping surfaces. Tests have shown that despite the provision of these protective sleeves, objectionable tube breakages have occurred. When the sleeves loosely surround the tubes, vibration has caused breakage at the base of the tube flares, or in other words, at the juncture of the tube proper and the flared end portion thereof. When it was attempted to remedy this condition by rendering the sleeves tight about the tubes throughout the length of the sleeves, vibration thus suddenly dampened at the sleeve ends resulted in breakages at that point.

Therefore, it is an object of the present invention to provide a novel tube and protective sleeve assembly in which the tube and sleeve are in permanent intimate wall to wall contact throughout a portion only of the length of the sleeve and including the tube end flare base, thereby causing tube vibrations to be dampened gradually in the sleeve and well above the tube end flare base.

Another object of the invention is to provide a novel tube element assembly comprising a tube to be coupled, and a protective sleeve surrounding the tube and including a flared portion opposed to the tube end, the walls of the tube and sleeve being engaged in intimate contact, and the tube end being flared into the flare of the sleeve.

Another object of the invention is to provide a novel tube element assembly of the character stated in which the sleeve body portion also is slightly flared throughout a portion of its length, in addition to the tube end flare opposing end portion thereof, and the tube is in intimate wall to wall contact with the sleeve throughout the slightly flared portion thereof.

With the above and other objects in view that will hereinafter appear, the nature of the invention will be more fully understood by following the detailed description, the appended claims and the several views illustrated in the accompanying drawings.

In the drawings:

Figure 1 is a central longitudinal section of a tube coupling embodying the invention.

Figure 2 is a central longitudinal section illustrating the tube and protective sleeve assembly prior to engagement of opposed wall portions thereof and the flaring of the tube end.

Figure 3 is a central longitudinal section illustrating the completed tube and sleeve assembly.

Figure 4:
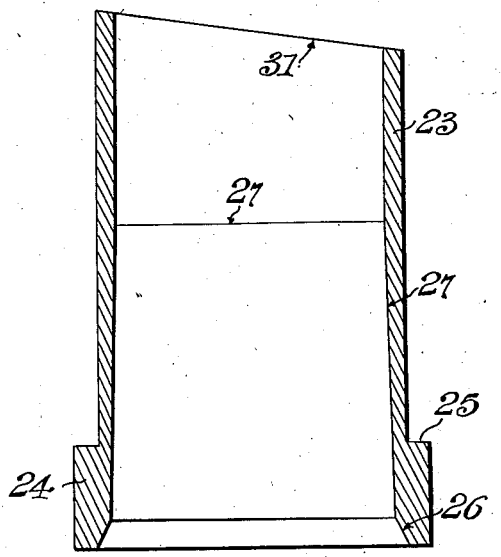
Figure 4 is a central logitudinal section illustrating a modified form of protective sleeve.

This application is a continuation in part of the application for U. S. Letters Patent Ser. No. 205,102, filed by Arthur L. Parker on April 29, 1938.

In order to more clearly illustrate the adaptation of the invention, there is illustrated in Figure 1 a complete coupling in which one of the tube and sleeve assemblies embodying the invention is securely clamped.

In the coupling illustrated in Figure 1, there is included a male coupling member 5 which includes a coniform seat extension 6 presenting a tapered clamping surface 7 for engagement in the flared end 8 of the tube 9 which is to be clamped in the coupling. The male member is externally threaded, as at 10, to receive the female member, and it will be observed by reference to the said Figure 1 that the bore in the male member and the bore in the tube to be coupled are of substantially of the same diameter.

The female member comprises a nut or clamp member 11 which is internally threaded, as at 12, and includes an abutment 13 formed in an extension 14 extending upwardly from said nut. A clamp sleeve 15 surrounds the tube 9 within the nut 11 and extends longitudinally beyond the nut extension 14 in the manner illustrated in Figure 1. This sleeve includes a lower enlargement 16 providing an abutment shoulder 17 adapted to be engaged by the abutment shoulder 13 of the nut and which has the lower end of its bore flared, as at 18, for engaging the flared end 8 of the tube 9. The external diameter of the sleeve enlargement 16 is smaller than the internal diameter of the receiving chamber within the nut 11 so as to provide a clearance 19.

The present invention resides in the provision of a novel sleeve and tube assembly in which the sleeve 15 and the tube 9 comprises an integrated unit to be clamped in a coupling the same in construction as or similar to the one illustrated in Figure 1.

In forming the assembly, the tube 9 and the relatively thin, flexible protective sleeve 15 which surrounds the same in close relation are loosely assembled in the manner illustrated in Figure 2, after which the opposing walls of the tube and sleeve are brought into permanent intimate contact, as at 20, throughout a portion only of the length thereof commencing at the sleeve flare 18. This wall-to-wall contact is preferably brought about by expanding the tube 9 by employment of any suitable expanding tube, preferably one such as is illustrated in the parent application heretofore referred to and of which this application is a continuation in part.

By bringing about permanent intimate wall-to-wall contact between the tube 9 and the sleeve 15 throughout a portion only of the length of the sleeve, the tube is very slightly spaced from the sleeve, as at 21, a distance below the free extremity of the sleeve, this spacing gradually diminishing as it approaches the commencement of the wall-to-wall contact between said tube and sleeve. In this manner vibrations set up in the coupled tube are gradually dampened.

It is also preferred that the free end of the tube 15 be angle cut, as at 22, so as to distribute longitudinally tube vibrations occurring at this point rather than to localize such vibrations at a single line extending transversely about the tube.

Tests have shown that when the tubes are loose within and surrounding the sleeves throughout the whole length of the sleeve commencing at the clamped flare of the tube, vibrations set up in the coupled tubes frequently break the tubes at the base of the flare. It has been found also that when the tubes are brought into intimate contact with the sleeves throughout the whole length of the sleeves, then the vibrations set up in the coupled tubes frequently result in breakage of the tubes at the free end extremities of the sleeve. By providing an assembly such as is illustrated in Figure 3 of the drawings and in which the tube is brought into permanent intimate wall-to-wall contact with the flexible surrounding sleeve throughout a portion only of the length of the sleeve, as indicated at 20, the vibrations in the coupled tube are gradually dampened and tube breakage is reduced to an absolute minimum. In other words, the sleeve of Figure 3 avoids abrupt checking or dampening of the tube vibrations by being long and thin and thus definitely flexible at the outer or free end, with a gradually increasing rigidity toward the inner or clamped end so that the tube vibrations will be gradually dampened over a substantial part of the tube and sleeve area.

Figure 5:
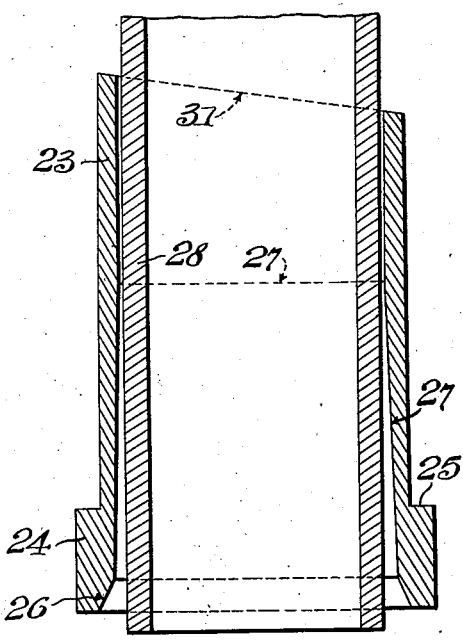
Figure 5 is a longitudinal sectional view illustrating the modified form of sleeve as loosely surrounding the tube end with which it is to be assembled.
Figure 6:
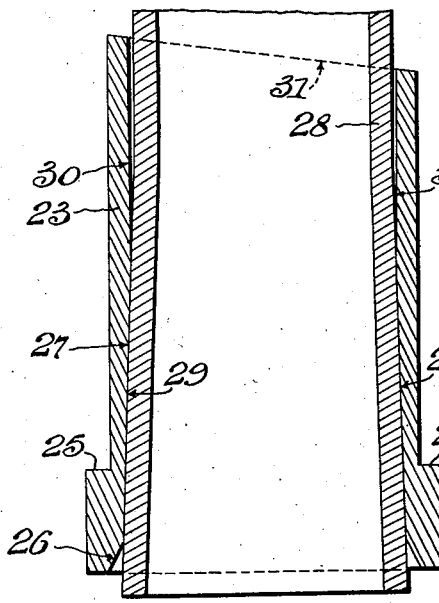
Figure 6 is a central longitudinal section illustrating the tube and sleeve as partially assembled, they having been brought into wall-to-wall contact prior to the flaring of the tube end.
Figure 7:
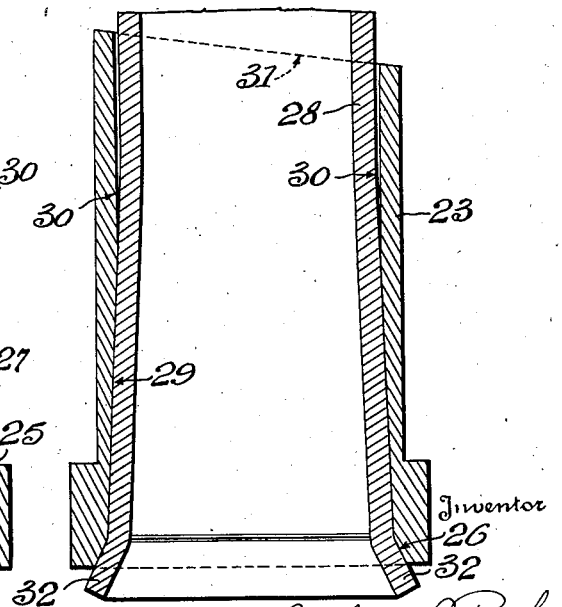
Figure 7 is a view similar to Figure 4 showing the completed sleeve and tube assembly.

In Figures 4 through 7 there is illustrated a modified form of the invention in which the sleeve 23 includes a head enlargement 24 providing an abutment shoulder 25, and which is flared, as at 26, to oppose the tube flare. In this modified form of the invention the sleeve 23 is slightly flared, as at 27, throughout a portion of the length thereof commencing at a distance below the upper or free end of the sleeve, as clearly illustrated in Figure 4, and terminating at or merging into the enlargement flare 26.

The tube 28 in this form of the invention is expanded into permanent intimate wall-to-wall contact with the whole of the slightly tapered portion 27 of the sleeve 23, and above the engaging wall portions of the tube and sleeve there is provided a gradual clearance, as indicated at 30, extending down a considerable distance from the angle cut free end 31 of the sleeve. It will be observed that the slight flare of the tube extends slightly above the terminus of the slight flare in the sleeve in the manner best illustrated in Figures 6 and 7 of the drawings. The end of the tube 28 is flared into permanent intimate contact with the sleeve flare 26, as indicated at 32 in the completely assembled unit illustrated in Figure 7.

All of the advantages stressed in connection with the form of the invention illustrated in Figures 1 to 3 of the drawings are provided in the modified form of the invention illustrated in Figures 4 through 7, and, in addition, the flaring of the sleeve and tube, as at 27, 29, further assures against pulling out of the tube 28 under use strains while coupled in a coupling of the nature illustrated in Figure 1.

It is of course to be understood that the details of structure and arrangement of parts may be variously changed and modified without departing from the spirit and scope of my invention.

I claim:

1. A tube element assembly comprising a metal tube to be coupled, and a thin flexible metal protective sleeve surrounding said tube at one end and including a flared portion opposed to the end portion of the tube, opposed wall portions of said tube and sleeve being engaged in permanent intimate wall-to-wall contact, and said tube being flared against the flare of the sleeve, said permanently and intimately engaged wall portions extending throughout a substantial portion of but less than the whole length of the sleeve commencing at the flared portion, thereby to gradually dampen vibrations set up in said tube when secured in a coupling.

2. A tube element assembly comprising a metal tube to be coupled, and a thin flexible metal protective sleeve surrounding said tube at one end and including a flared portion opposed to the end portion of the tube, opposed wall portions of said tube and sleeve being engaged in permanent intimate wall-to-wall contact, and said tube being flared against the flare of the sleeve, said permanently and intimately engaged wall portions extending throughout a substantial portion of but less than the whole length of the sleeve commencing at the flared portion, thereby to gradually dampen vibrations set up in said tube when secured in a coupling, and said sleeve terminating in an angularly cut end portion effective to longitudinally distribute the vibration dampening effect of said end portion.

3. A tube element assembly comprising a metal tube to be coupled, and a thin flexible metal protective sleeve surrounding said tube at one end and including a flared portion opposed to the end portion of the tube, opposed wall portions of said tube and sleeve being engaged in permanent intimate wall-to-wall contact, and said tube being flared against the flare of the sleeve, said permanently and intimately engaged wall portions extending throughout a substantial portion of but less than the whole length of the sleeve commencing at the flared portion, thereby to gradually dampen vibrations set up in said tube when secured in a coupling, and said sleeve including a slightly flared portion forming at least a part of the wall portion thereof which is in permanent and intimate contact with the tube.

4. A tube element assembly comprising a metal tube to be coupled, and a thin flexible metal protective sleeve surrounding said tube at one end and including a flared portion opposed to the end portion of the tube, opposed wall portions of said tube and sleeve being engaged in permanent intimate wall-to-wall contact, and said tube being flared against the flare of the sleeve, said permanently and intimately engaged wall portions extending throughout a substantial portion of but less than the whole length of the sleeve commencing at the flared portion, thereby to gradually dampen vibrations set up in said tube when secured in a coupling, and said sleeve including a slightly flared portion forming at least a part of the wall portion thereof which is in permanent and intimate contact with the tube, and said tube being slightly flared throughout the length of the slightly flared sleeve portion and for a portion of its length therebeyond thereby to facilitate the gradual dampening of said vibrations.

ARTHUR L. PARKER.